(12) United States Patent
Calloway

(10) Patent No.: US 7,969,105 B2
(45) Date of Patent: Jun. 28, 2011

(54) CAPACITOR BASED ENERGY STORAGE

(76) Inventor: Randall L. Calloway, Corpus Christi, TX (US)

(\*) Notice: Subject to any disclaimer, the term of this patent is extended or adjusted under 35 U.S.C. 154(b) by 447 days.

(21) Appl. No.: 12/288,817

(22) Filed: Oct. 23, 2008

(65) Prior Publication Data

US 2009/0109712 A1 Apr. 30, 2009

Related U.S. Application Data

(60) Provisional application No. 61/000,122, filed on Oct. 24, 2007.

(51) Int. Cl.
*H02P 25/30* (2006.01)
(52) U.S. Cl. ............. 318/139; 307/66; 363/17
(58) Field of Classification Search ............... 307/64, 307/66, 45, 46, 75, 10.01, 10.08; 324/678, 324/679, 688, 662; 318/140, 148, 153, 376, 318/801; 363/16, 17, 25, 97, 98, 65, 71; 323/266, 361, 269, 211, 259
See application file for complete search history.

(56) References Cited

U.S. PATENT DOCUMENTS

| | | | | |
|---|---|---|---|---|
| 4,794,273 A * | 12/1988 | McCullough et al. | ........ | 307/139 |
| 5,552,681 A * | 9/1996 | Suzuki et al. | ................. | 318/139 |
| 5,757,630 A * | 5/1998 | Lesea | .............................. | 363/39 |
| 5,920,469 A | 7/1999 | Harvey | | |
| 7,023,107 B2 * | 4/2006 | Okuda et al. | ................. | 307/10.1 |
| 7,209,369 B1 * | 4/2007 | Yasumura | ........................ | 363/16 |
| 7,323,849 B1 | 1/2008 | Robinett | | |
| 7,541,758 B2 * | 6/2009 | Inaba et al. | ................... | 318/140 |
| 7,606,053 B2 * | 10/2009 | Chen et al. | ..................... | 363/132 |
| 2008/0021602 A1 | 1/2008 | Kingham | | |

\* cited by examiner

*Primary Examiner* — Rajnikant B Patel
(74) *Attorney, Agent, or Firm* — G. Turner Moller

(57) ABSTRACT

An electrical storage device comprises a capacitor or capacitor bank capable of storing significant quantities of electricity. An inverter in circuit with the capacitor converts direct energy of the capacitor into alternating current. A variable ratio transformer is in circuit with the output of the inverter to produce an alternating current output of controlled voltage. The impedance of the transformer acts to prolong discharge of the capacitor over a significant time period. To further control the rate of discharge of the energy storage capacitor, an additional capacitor may be provided in the transformer circuit.

19 Claims, 2 Drawing Sheets

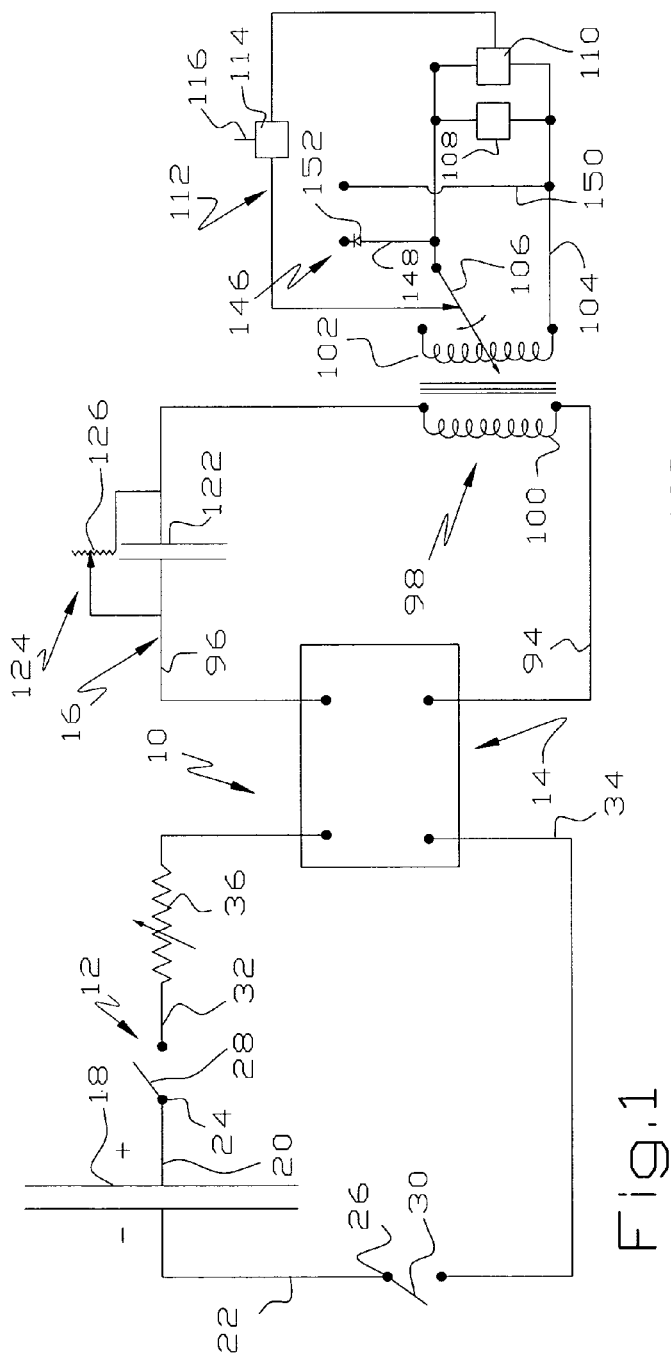
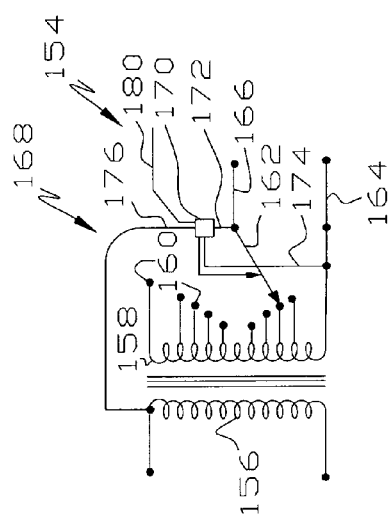
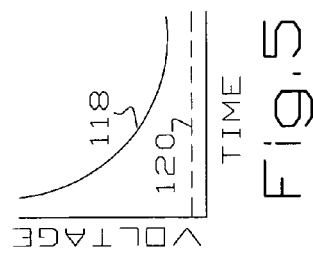
Fig. 1
Fig. 7
Fig. 5

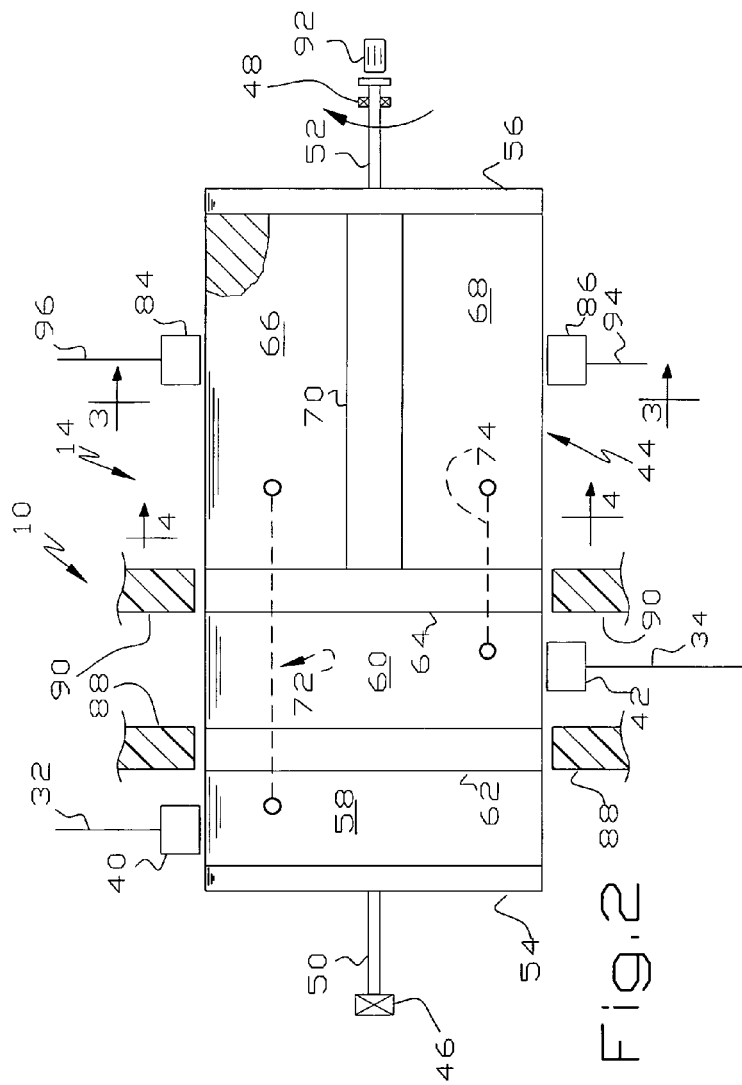
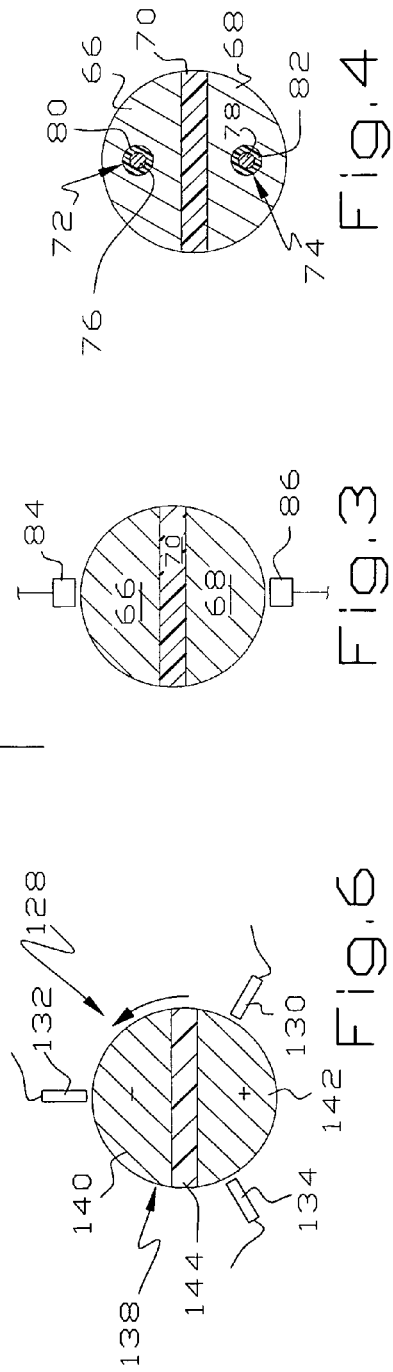

CAPACITOR BASED ENERGY STORAGE

This application is based on Provisional Application Ser. No. 61/000,122, filed Oct. 24, 2007, the priority of which is claimed.

This invention relates to an energy storage device incorporating a capacitor and a circuit allowing slow discharge of the capacitor.

BACKGROUND OF THE INVENTION

The standard approach to store electrical energy is by using electrochemical batteries. Although batteries have undergone several centuries of development, deficiencies remain particularly for applications which recently have become practical or desirable. For example, the general consensus is that a practical, inexpensive electrically driven automobile awaits the development higher capacity, less expensive batteries which can be charged sufficiently to provide a practical radius of operation. Current electrically driven vehicles are not close to being competitive, in cost or performance, with internal combustion engine driven cars and trucks. Although electrically driven vehicles have recently enjoyed considerably improved performance, internal combustion engines have also improved, meaning that the relative advantage of combustion engine vehicles remains substantial.

It is known to use a capacitor to store direct current electrical energy, particularly in smaller capacity sizes. A major problem with capacitors as energy storage devices is they discharge immediately, producing a relatively large burst of energy over a very short time. Often, this does meet the requirements of the device to be driven, i.e. often the driven device requires delivery of energy over a prolonged period of time. In other words, the discharge rate of capacitors is often not matched with the energy rate requirement of a device that is desired to be powered.

Another major problem with capacitors is the voltage declines as energy is discharged. This also produces a mismatch of the characteristics of capacitors compared to the requirements of a device to be driven. The amount of energy stored in a capacitor is a function of the square of the voltage, as follows:

$$\text{energy stored} = W = \tfrac{1}{2} \times C \times E^2$$

where W is the energy stored in joules, C is the capacitance of the capacitor in Farads and E is the voltage of the capacitor in volts. As the energy stored in a capacitor is used, the voltage declines so that electrical motors, for example, normally cannot be driven by capacitors for a prolonged length of time.

Disclosures of interest may be found in U.S. Pat. Nos. 5,920,469 and 7,323,849 and Printed Patent Application 2008/0021602.

SUMMARY OF THE INVENTION

This invention uses a capacitor or capacitor pack of an appropriate size in conjunction with an inverter to convert direct current stored by the capacitor into alternating current. The inverter is in circuit with a variable ratio transformer so the output voltage of the device can be controlled in a suitable manner, for example to be more-or-less constant. In other words, as the capacitor discharges and produces less voltage, the transformer can be manipulated to produce an output voltage that is matched with a driven device, such as an electrical motor.

In some embodiments, the inverter used in this invention is a mechanical inverter in order to handle high voltages that currently available solid state inverters are either incapable of handling or are very expensive, it being understood that high voltage solid state inverters could be used in this invention.

Interestingly, the impedance of the transformer subjected to the alternating current acts to prevent immediate discharge of the capacitor thereby prolonging the time the capacitor can drive its work producing device. Control of the capacitor discharge can also be ensured by adding one or more capacitors in the primary transformer coil circuit.

It is an object of this invention to provide an improved technique for storing electrical energy.

Another object of this invention is to provide a technique for storing electrical energy using a capacitor and a circuit to control the discharge of the capacitor.

A further object of this invention is to provide an improved electrical storage device using a capacitor and a circuit to produce a more-or-less constant voltage output.

These and other objects and advantages of this invention will become more fully apparent as this description proceeds.

BRIEF DESCRIPTION OF THE DRAWINGS

FIG. 1 is a partly schematic view of an energy storage device of this invention;

FIG. 2 is a side view, partly in section, of a mechanical inverter usable in this invention;

FIG. 3 is an enlarged cross-sectional view of the inverter of FIG. 2, taken substantially along line 3-3 of FIG. 2, as viewed in the direction indicated by the arrows;

FIG. 4 is an enlarged cross-sectional view of the inverter of FIG. 2, taken substantially along line 4-4 thereof, as viewed in the direction indicated by the arrows;

FIG. 5 is a diagram showing voltage patterns of one of the embodiments of this invention;

FIG. 6 is a cross-sectional view of a three phase mechanical inverter; and

FIG. 7 is a schematic view of another type transformer usable in this invention.

DETAILED DESCRIPTION OF THE INVENTION

Referring to FIG. 1, an energy storage device or circuit 10 comprises, as major components, a capacitor circuit 12, an inverter 14 having an input in circuit with the circuit 12 and an output in circuit with a transformer circuit 16.

The capacitor circuit 12 comprises one or more capacitors or capacitor packs 18 of suitable size connected to leads 20, 22 which connect to a terminal 24, 26 of switches 28, 30 so the capacitor 18 may be isolated during recharging. High Farad capacitors are not currently in great demand and the capacitors available commercially are low voltage, meaning they store little power. Conversely, high voltage capacitors that are now commercially available are used to correct power factors and have low Farad design values. However, the construction of high voltage, high Farad capacitors is well within the skill of the art.

The other side of the switches 28, 30 connect to leads 32, 34 one of which provides a varistor 36 therein. The leads 32, 34 terminate in an input to the inverter 14. The parallel adjustable resistors and capacitors in the circuit 12, and in the circuit 16 as will be more fully apparent hereinafter, serve to optimize the circuit performance regarding frequency response, losses and the like.

In some embodiments, as shown in FIG. 2, the inverter 14 is an electromechanical inverter in order to accommodate very high voltages that might not be possible with solid state inverters. In some embodiments, solid state inverters are technically and economically feasible. There is a definite advantage to high voltage capacitor banks 18 because the amount of energy that a capacitor can store is proportional to the square of the voltage.

It will be apparent that the electromechanical inverter 14 may be of any suitable design. In some embodiments, the inputs comprise contact brushes 40, 42. The inverter 14 comprises a body 44 mounted for rotation in any suitable manner, as by the provision of bearings 46, 48 mounted on aligned shafts 50, 52 connected to insulated end caps 54, 56 on the ends of the body 44. The body 44 comprises a pair of conductive disks 58, 60 in contact with the input brushes 40, 42. The disks 58, 60 are isolated by a pair of insulating disks 62, 64.

The output end of the inverter 14 can comprise a pair of conductive semi-cylindrical elements 66, 68 separated by an insulating layer 70. The conductive disk 58 is electrically connected to one of the elements 66, 68 by an insulated path 72 while the other disk 60 is electrically connected to the other element 66, 68 by an insulated path 74. As shown best in FIG. 4, the insulated paths 72, 74 can comprise metal conductors 76, 78 surrounded by an insulating sheath 80, 82 and terminating in the metal elements 66, 68. The outputs of the inverter 14 can comprise contact brushes 84, 86. Insulated partitions 88, 90 can be provided on the inside of an insulated housing (not shown) to suppress arcing across the insulating partitions 62, 64.

The inverter body 44 may be rotated in any suitable manner, as by the provision of a small motor 92 connected to one of the shafts 50, 52. The inverter 14 converts direct current from the capacitor bank 18 into alternating current because the conductive element 66 is always in electrical contact with one side of the capacitor bank 18 and the other conductive element 68 is always in electrical contact with the other side of the capacitor bank 18 while the output brushes 84, 86 alternately contact the conductive elements 66, 68. Those skilled in the art will recognize that the shape of the alternating current created by the inverter 14 tends to be "squarish" on an oscilloscope while conventional alternating current tends to be analogous to a sine wave. It will also be apparent to those skilled in the art that the shape of the alternating current can be modified in any suitable manner.

It will be apparent that the inverter 14 produces single phase alternating current. It will likewise be apparent that the inverter body 44 may be redesigned to produce multiphase alternating current if the requirements of the work producing device so dictate as explained in connection with FIG. 6.

The transformer circuit 16 includes leads 94, 96 connecting the brushes 84, 86 to a variable ratio transformer 98 which normally converts high voltage in a primary coil 100 to a lower voltage in a secondary coil 102. The transformer 98 may have its variable ratio feature provided in any suitable manner, such as having a movable contact on the primary coil, a movable contact on the secondary coil as shown in FIG. 1, a movable contact on both the primary and secondary coils, stepped contacts or multiple taps on the primary and/or secondary coils with either a movable contact arm or solid state switches or any other suitable approach. In FIG. 1, the transformer 98 includes a primary coil 100 in circuit with the inverter output brushes 84, 86, a secondary coil 102, a fixed contact 104 and a movable contact 106 on the secondary coil 102. An alternating current driven work producing device 108 is connected to the contacts 104, 106 and is driven thereby.

In some embodiments, the voltage delivered by the transformer coil 102 is automatically controlled in any suitable manner, as by a sensor 110 measuring the voltage across the device 108 and operating a servo circuit 112 to move the contact 106 to produce a desired voltage pattern over time. In many embodiments, such as where the work producing device 108 is an alternating current motor, it is preferred to provide a more-or-less constant voltage across the contacts 104, 106. In other embodiments, the contact 106 may be moved in response to a signal from the sensor 110 to a data processor or computer 114 in combination with instructions from a data base or source 116 to produce a voltage pattern other than more-or-less constant. As shown graphically in FIG. 5, the voltage appearing in the capacitor bank 18 during discharge is illustrated as curve 118, i.e. the voltage falls off over time. In contrast, the voltage appearing on the transformer outputs 104, 106 is, in some embodiments, more-or-less constant as shown by dashed line 120.

An interesting feature of this invention is that the impedance in the transformer 98 inherently prolongs the duration of discharge of the capacitor banks 18 and the design of the transformer 98 may be modified to adjust the duration of discharge of the capacitor bank 18. In some embodiments, one or more capacitors 122 may be provided in one of the transformer leads 94, 96 in order to ensure that the energy in the capacitor bank 18 does not discharge too rapidly, but is rather used as needed by the work producing device 108 served by the transformer 98. The capacitor 122 tunes the transformer circuit 16 to the frequency defined by the capacitor 122, the inductance of the transformer 98 and the resistance of the circuit 16. It will be evident that the capacitor 122 passes alternating current but not direct current. The capacitor 122 accordingly avoids "stalling" or rapid discharge of the capacitor 18 if there were a failure of the motor 92 to turn the mechanical inverter 14. In addition, the capacitor 122 insures there will be no direct discharge of the primary energy storage capacitor 18 and its resistance adds to the impedance of the primary transformer coil 100. In some embodiments, the capacitor 122 may be trimmed by the addition of a subcircuit 124 including a variable resistor 126 in parallel with the capacitor 122. The variable resistor 126 allows the frequency of the transformer circuit 16 to be modified to meet conditions that may be variable from one application to the next.

Another interesting feature of this invention is the amount of energy that can be stored and then withdrawn in a prolonged manner. Table I shows a selection of capacitors of different size and their capacity to store electrical energy.

TABLE I

| $W = \frac{1}{2} * C * E^2$ | | |
|---|---|---|
| size capacitor, in Farads C | voltage, in volts E | energy stored, in joules W |
| 1 | 100 | 5,000 |
| 1 | 1000 | 500,000 |
| 1 | 2000 | $2 \times 10^6$ |
| 1 | 5000 | $12.5 \times 10^6$ |
| 1 | 10000 | $50 \times 10^6$ |
| 1 | 20000 | $200 \times 10^6$ |
| 2 | 100 | 10,000 |
| 2 | 1000 | $1 \times 10^6$ |
| 2 | 2000 | $4 \times 10^6$ |
| 2 | 5000 | $25 \times 10^6$ |
| 2 | 10000 | $100 \times 10^6$ |
| 2 | 20000 | $400 \times 10^6$ |
| 10 | 10000 | $500 \times 10^6$ |
| 10 | 100000 | $5 \times 10^{12}$ |

To place these numbers in perspective, an 8.6 Farad capacitor charged to 10,000 volts stores sufficient energy to drive a 20 horsepower motor for 8 hours in an ideal situation with no losses or inefficiencies. Normal losses and inefficiencies, such as wind resistance, tire friction, power transmission losses, circuit resistance, winding losses and the like, reduce this output significantly.

In order to recharge the capacitor 18, the switches 26, 28 are opened and a direct current source (not shown) connected to the terminals 24, 26. When the capacitor bank 18 is recharged, the source is disconnected and the switches 26, 28 closed. In some embodiments, a source of high voltage is desirable to charge the capacitor 18. In order to do this economically, suitable switches (not shown), a plug (not shown) and a rectifier (not shown) can be provided to use the transformer 98 to convert available alternating current into high voltage direct current to charge the capacitor 18 as opposed to providing a separate transformer at a charging location.

Referring to FIG. 6, there is illustrated one approach, out of many, for designing a multiphase electromechanical inverter 128. The inverter 128 is identical to the inverter 14 except there are three outlet brush contacts 132, 134, 136 spaced 120° apart. Rotation of the inverter body 138 connects the brush contacts 132, 134, 136 to the conductive elements 140, 142 which are insulated from each other by the insulating partition 144 in such a manner to produce three phase alternating current. It will be apparent to those skilled in the art that many other designs of multiphase alternating current inverters are also operable in this invention.

Another interesting feature of this invention is shown in FIG. 1. In some embodiments, a subcircuit 146 comprising a pair of leads 148, 150 connect to the output of the secondary transformer coil 102 to provide a direct current output. In some embodiments, this may be accomplished by providing a rectifier 152 in one of the leads 148, 150.

Referring to FIG. 7, there is illustrated another embodiment of a variable ratio transformer 154 having a primary coil 156 connected to an inverter for delivering alternating current from the capacitor 18 and a secondary coil 158 providing an alternating current output of suitable voltage. The secondary coil 158 includes a series of taps 160 and a movable contact arm 162 mounted for movement in a path intersecting the taps 160 to provide a reduced output voltage on the leads 164, 166 as will be recognized by those skilled in the art. In some embodiments, a servo circuit 168 automatically adjusts the position of the movable contact arm 162. To this end, a controller 170 determines the voltage output of the secondary coil 158 through leads 172, 174 to control the position of the movable contact arm 162. In addition or in the alternative, the controller 170 may determine the reference voltage of the primary coil 156 through a lead 176 and may communicate with other voltage instructions through a lead 180 connected to a data base or software instructions to control the position of the movable arm 162.

It will be evident there are many applications for the energy storage device 10 of this invention such as a power source for golf carts, over the road or off road motor vehicles, a replacement for large battery installations, capturing energy from lightning by recharging the capacitor during a storm and later discharging the energy into the power grid, and the like. It is also apparent that this invention is useful in installations of a wide range of capacities.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. An electrical storage device comprising a capacitor for storing direct current, an inverter in circuit with the capacitor for producing alternating current from the direct current of the capacitor, a transformer having a primary coil in circuit with the inverter for receiving alternating current of a first voltage from the inverter and a secondary coil providing alternating current of a second voltage and means for varying a ratio between the first and second voltages.

2. The device of claim 1 wherein the secondary coil is connected to a work producing device.

3. The device of claim 2 wherein the work producing device is an electric motor.

4. The device of claim 1 wherein the inverter is a mechanical inverter comprising a rotating body having electrical inputs and outputs connected by electrical paths isolated from each other, the inputs being in circuit with the capacitor and the outputs being in circuit with the transformer and a motor for rotating the body and producing an alternating current at the electrical outputs.

5. The device of claim 1 wherein the means for varying a ratio between the first and second voltages is part of the transformer.

6. The device of claim 5 wherein the secondary coil comprises a first contact and a second movable contact for varying voltage output from the coil.

7. The device of claim 6 wherein the first contact is fixed.

8. The device of claim 6 wherein the secondary coil comprises a series of taps and the movable contact is mounted for movement in a path intersecting the series of taps.

9. The device of claim 5 wherein the primary coil comprises a first contact and a second movable contact for varying the voltage output from the coil.

10. The device of claim 9 wherein the first contact is fixed.

11. The device of claim 9 wherein the first contact is movable.

12. The device of claim 1 where the transformer has an impedance and the impedance of the transformer acts to prolong discharge of the capacitor.

13. The device of claim 1 further comprising at least one second capacitor in circuit between the inverter and the primary transformer coil.

14. The device of claim 13 further comprising an adjustable resistor in parallel with the second capacitor.

15. The device of claim 1 wherein the inverter is designed to produce single phase alternating current.

16. The device of claim 1 wherein the inverter is designed to produce multiphase alternating current.

17. The device of claim 1 wherein a subcircuit connects to the secondary coil providing a direct current output.

18. The device of claim 17 wherein the subcircuit comprises a rectifier.

19. The device of claim 1 further comprising a varistor in circuit between the capacitor and the inverter.

* * * * *